United States Patent
Kohlhoff et al.

(10) Patent No.: US 10,262,083 B2
(45) Date of Patent: Apr. 16, 2019

(54) DATA TRANSFORMATION FROM 3D MODEL OF MATERIAL

(71) Applicant: SAP SE, Walldorf (DE)

(72) Inventors: Stephan Kohlhoff, Darmstadt (DE); Juergen Kniephof, Bad Schönborn (DE)

(73) Assignee: SAP SE, Walldorf (DE)

(*) Notice: Subject to any disclaimer, the term of this patent is extended or adjusted under 35 U.S.C. 154(b) by 522 days.

(21) Appl. No.: 14/921,180

(22) Filed: Oct. 23, 2015

(65) Prior Publication Data

US 2017/0116352 A1    Apr. 27, 2017

(51) Int. Cl.
| | | |
|---|---|---|
| G06F 17/50 | (2006.01) | |
| G06Q 10/06 | (2012.01) | |
| G06Q 10/00 | (2012.01) | |

(52) U.S. Cl.
CPC .......... *G06F 17/50* (2013.01); *G06Q 10/06* (2013.01); *G06Q 10/20* (2013.01); *G06F 2217/16* (2013.01); *Y02P 90/86* (2015.11)

(58) Field of Classification Search
CPC .............................. G06F 17/50; G06F 2217/16
USPC .......................................................... 703/1
See application file for complete search history.

(56) References Cited

U.S. PATENT DOCUMENTS

| | | |
|---|---|---|
| 5,465,221 A | 11/1995 | Merat et al. |
| 5,848,948 A * | 12/1998 | Allen .................. F16H 7/06 474/156 |
| 6,295,513 B1 * | 9/2001 | Thackston ......... G05B 19/4099 703/1 |
| 6,304,680 B1 | 10/2001 | Blake et al. |
| 7,119,805 B2 | 10/2006 | Batori et al. |
| 7,720,624 B2 | 5/2010 | Shimizu |
| 7,757,203 B2 | 7/2010 | Scholl et al. |
| 8,010,315 B2 | 8/2011 | Wu et al. |

(Continued)

OTHER PUBLICATIONS

Zhao, An integrated process planning system for machining and inspection, 2009, Doctoral dissertation, University of Auckland, 263 pages.*

(Continued)

*Primary Examiner* — Juan C Ochoa
(74) *Attorney, Agent, or Firm* — Schwegman Lundberg & Woessner, P.A.

(57) ABSTRACT

A computer implemented method has operations including receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic, converting the 3D CAD file into a neutral 3D file preserving the PMI data, parsing the PMI data via the executing integrated inspection application to obtain lower and upper values of the characteristic of the product as a function of the tolerance value, storing the neutral 3D file, linking the neutral 3D file to the part in the ERP system, creating an inspection plan including an inspection characteristic linked to the part, transferring the PMI data to the inspection characteristic, and providing a view of the inspection characteristic showing the lower and upper values.

20 Claims, 10 Drawing Sheets

(56) References Cited

U.S. PATENT DOCUMENTS

| | | | |
|---|---|---|---|
| 8,065,116 B2* | 11/2011 | Sims, Jr. | G06F 17/50 700/103 |
| 8,243,067 B2 | 8/2012 | Konev et al. | |
| 8,249,832 B2 | 8/2012 | Motzer et al. | |
| 8,401,687 B2 | 3/2013 | Kohlhoff | |
| 8,477,154 B2 | 7/2013 | Davis et al. | |
| 8,494,894 B2* | 7/2013 | Jaster | G06F 17/30734 705/7.29 |
| 8,612,040 B2 | 12/2013 | Thomas et al. | |
| 2012/0130521 A1* | 5/2012 | Kohlhoff | G06T 19/00 700/98 |
| 2013/0117710 A1 | 5/2013 | Walter et al. | |
| 2014/0195963 A1* | 7/2014 | Cheung | G06F 17/50 715/781 |
| 2015/0324940 A1* | 11/2015 | Samson | G06Q 10/06313 705/7.23 |

OTHER PUBLICATIONS

"PMI Module", Right Hemisphere, (2006), 2 pgs.
"Product and Manufacturing Information (PMI): 3D Model Documentation", Siemens, (2011), 3 pgs.
Zhao, Fiona, et al., "Computer-Aided Inspection Planning—The state of the art", vol. 60, Issue 7, (Sep. 2009), 453-466.

* cited by examiner

DATA TRANSFORMATION FROM 3D MODEL OF MATERIAL

TECHNICAL FIELD

Embodiments described herein generally relate to data transformation from a 3D Model of Material.

BACKGROUND

Part and product design is commonly model driven, which means that 3D modeling is employed instead of 2D drawings. This is possible, since modern CAD (Computer Aided Design) software systems support 3D design. This leads to a much more realistic representation of the final part or product compared to a 2D drawing. However, textual information is still a necessary and important complement of a 3D model to completely define a design. One important example for such textual information is dimensional tolerance. Tolerances define minimum and maximum values of a dimension. Since dimensions in a model are always single valued by nature, tolerances cannot be derived from the model but must be added separately.

PMI stands for Product and Manufacturing Information and is used to convey non-graphical information in 3D CAD Models. PMI includes dimension and tolerance, but also simple text, arrows, balloons, datum, fastener information, GD&T (Geometrical Dimension and Tolerances), measurement points, surface roughness, and welding. PMI is a standard, which is supported by all major CAD vendors, although the way how the data is represented within the CAD system is not standardized.

SUMMARY

A computer implemented method has operations including receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic, converting the 3D CAD file into a neutral 3D file preserving the PMI data, parsing the PMI data via the executing integrated inspection application to obtain lower and upper values of the characteristic of the product as a function of the tolerance value, storing the neutral 3D file, linking the neutral 3D file to the part in the ERP system, creating an inspection plan including an inspection characteristic linked to the part, transferring the PMI data to the inspection characteristic, and providing a view of the inspection characteristic showing the lower and upper values.

A machine readable storage device has instructions for execution by a processor of the machine such that when executed, cause the machine to perform operations. The operations include receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic, converting the 3D CAD file into a neutral 3D file preserving the PMI data, parsing the PMI data via the executing integrated inspection application to obtain lower and upper values of the characteristic of the product as a function of the tolerance value, storing the neutral 3D file, linking the neutral 3D file to the part in the ERP system, creating an inspection plan including an inspection characteristic linked to the part, transferring the PMI data to the inspection characteristic, and providing a view of the inspection characteristic showing the lower and upper values.

A device includes a processor and a memory device coupled to the processor and having a program stored thereon for execution by the processor, that when executed, cause the processor to perform operations. The operations include receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic, converting the 3D CAD file into a neutral 3D file preserving the PMI data, parsing the PMI data via the executing integrated inspection application to obtain lower and upper values of the characteristic of the product as a function of the tolerance value, storing the neutral 3D file, linking the neutral 3D file to the part in the ERP system, creating an inspection plan including an inspection characteristic linked to the part, transferring the PMI data to the inspection characteristic, and providing a view of the inspection characteristic showing the lower and upper values.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Before a part is used in a product process like product assembly, it should be inspected to verify, that it meets all necessary product characteristics. This is usually done, after it is being manufactured, or, if supplied by a vendor, upon goods receipt. One important set of product characteristic of a part are its dimensions including specified tolerances. A work order to conduct such an inspection is called an inspection order. An inspection order has a reference to the part, which is to be inspected and a so called inspection plan, which describes what and how the inspection is to be conducted. The inspection plan then contains so called inspection characteristics, which carries the information about the inspection data, e.g. dimension and tolerances.

These inspection plans and its characteristics are usually maintained manually, by retrieving 3D data from a CAD model, reading the respective information from the 3D CAD model and manually typing in the respective information in the inspection plan. The manual conversion is tedious and error prone, and further requires a quality engineer to have a CAD license and be trained to handle the CAD system. Alternatively, a CAD designer derives a 2D drawing with all necessary information from the 3D Model and passes this to the quality engineer, who either prints the 2D drawing or uses a 2D viewer. Again, the translation of the textual dimension and tolerances is done manually or with the aid of additional software, which is usually not integrated into quality management software, where inspection planning and results recording may be executed.

In one embodiment, product and manufacturing information (PMI) data is directly retrieved from the 3D model, transformed, and linked to inspection characteristics of an inspection plan. If no inspection characteristics exists, one or more may be created. No manual interaction is required, which will ensure, that errors, which can occur in such manual interactions, will be avoided.

Once the PMI data is linked to the inspection characteristics the inspection plan can be created and will be used in results recording within the entire inspection process. Since now the inspection plan is connected to the 3D model, inspection order processing can also be visually supported as well during results recording.

Visual inspection planning supports the communication and data exchange between customer and supplier. These collaborative processes are used within the production part approval process. Data in inspection plans can be exported and sent to suppliers. The supplier produces parts and records measured values with respect to the inspection characteristics. This results recording is also supported via 3D visualization.

Advantages of various embodiments may include one or more of significant process time reduction and improved process stability supporting a zero-defect approach, automatic data transfer from 3D to inspection plan, mass selection of PMI data before data transfer, automatic detection of changes and corresponding updates, and simplification through reduction of process steps, interfaces, cost, and single source of truth. The 3D model contains the original inspection planning data, the process step of 2D drawing derivation will be dropped supporting a zero-defect approach, and improved usability via 3D visualization throughout the entire quality inspection process.

Figure 1:
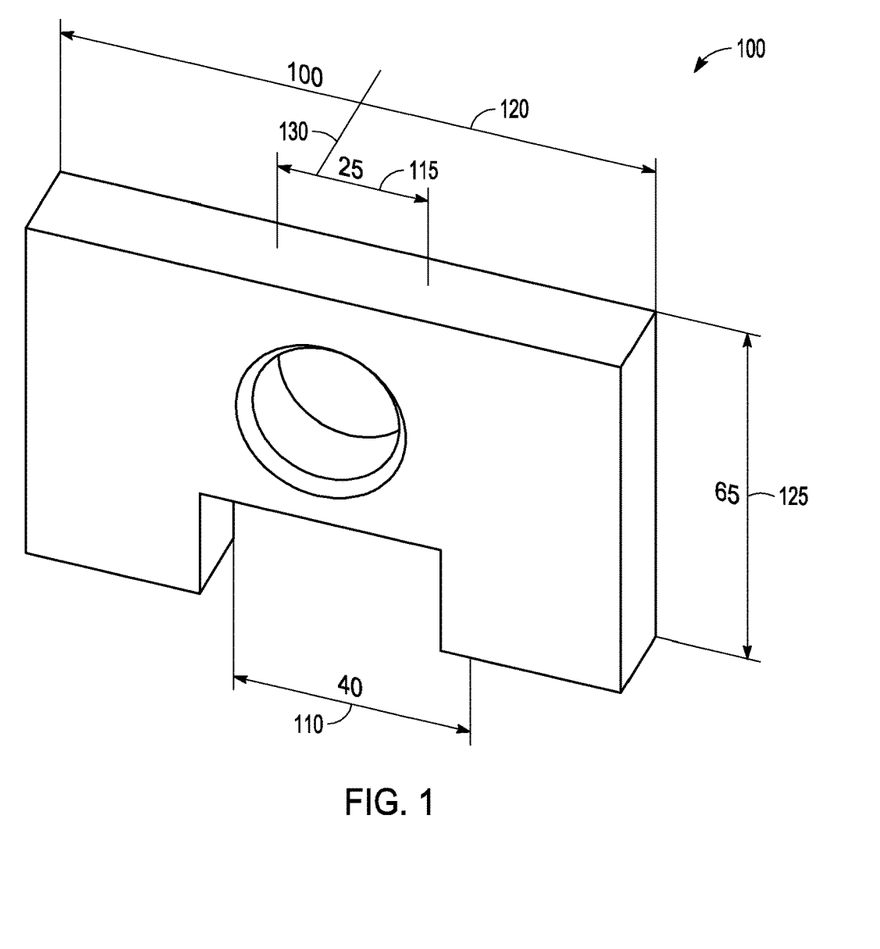
FIG. 1 is a block diagram of a view of a material represented as a three dimensional (3D) model that includes a display of tolerance information about the material according to an example embodiment.

FIG. 1 is a block diagram of a view of a part 100 represented as a three dimensional (3D) model that includes a display of tolerance information about the part 100. The model itself may be generated via a standard computer aided design (CAD) program. The tolerance information, such as for example dimension 110 "40+−0.1" identifying the length of a rectangular cut in part 100 may be added to the model as PMI data and displayed along with the view of the part 100. Note that several other dimensions of the part 100 are also illustrated in FIG. 1 including a diameter of an opening 115, a total length 120, a width 125 and a depth 130. These are just examples of different dimensions that may be included in the PMI data for this particular part. Many other dimensions and other parameters used to specify different types of parts or other articles of manufacture may be specified in the PMI in further embodiments.

In one embodiment, the PMI is stored with the 3D model as structured text. The PMI may be stored in a CAD file as a separate object. The PMI object references the material or part it is associated with. When more than one PMI object is present per part they may be grouped together. Each PMI object has associated metadata where text is stored. The text is to be converted to numerical values. The PMI object has an internal ID, which is used to reference it and to create a link between this ID and a database entry in a quality management system, which represents a corresponding inspection characteristic.

Figure 2:
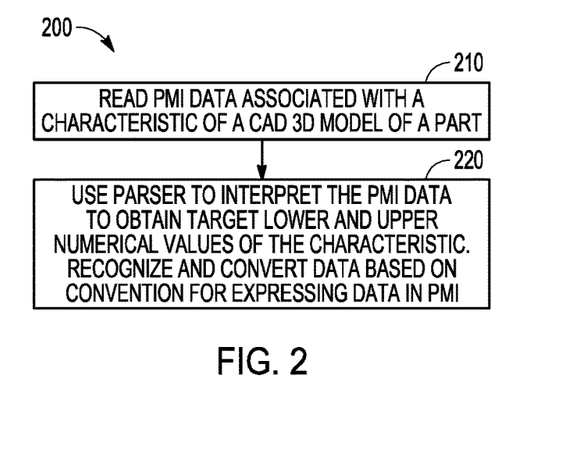
FIG. 2 is a flowchart illustrating a method of transforming product management information (PMI) structured text into a form that can be read according to an example embodiment.

FIG. 2 is a flowchart illustrating a method 200 of transforming PMI structured text into a form that can be read. At 210, PMI information associated with a characteristic, such as a dimension is read. Tolerances associated with characteristics of the part 100 are derived by interpreting the text at 220 to determine an upper and a lower value for each characteristic. A parser may be used to perform the interpretation. A characteristic of a part may be stored as structured text (4.0±0.1) as indicated at 110 in FIG. 1 for example. The text "±" is interpreted to provide target, lower, and upper numerical values for the characteristic as 40.0, 39.9 and 40.1 respectively. Note that some notations for values may use a typical European convention of commas instead of the US convention that uses decimal points, and using decimal points instead of the US convention for use of commas in numbers. The parser will recognize this difference as part of the text interpretation at 220 by either using an indication of the convention used for numbers in PMI data for a particular model, or recognizing that that numbers in the model appear to be following one convention or the other. The technical aspect about the conversion is that a text string like "3.5±0.01" gets converted into three numerical values, namely. 1.) a target numerical value, 2.) a lower numerical value, 3.) an upper numerical value.

In one embodiment, the method 200 is performed by a programmed computer as part of an enterprise resource planning (ERP) system. An ERP system is typically a suite of integrated applications used by a company to collect, store, manage, and interpret data from many business activities, including manufacturing. One of the integrated applications may be an inspection plan generator, which provides instructions on how to inspect a manufactured part to make sure the part has proper dimensions and other characteristics.

Figure 3:
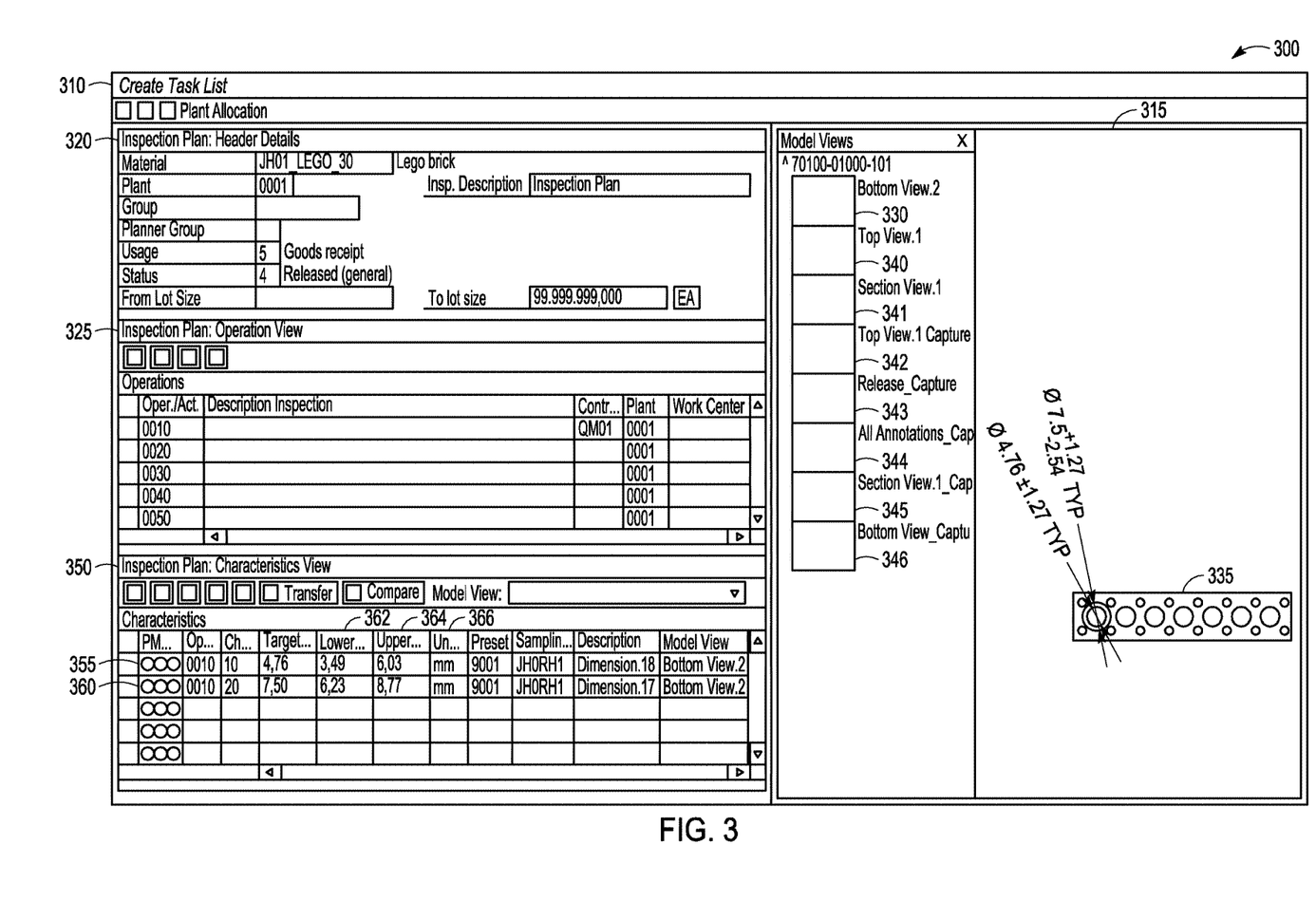
FIG. 3 is a screen shot of a view provided by an inspection plan generator used to create a task list for inspection of characteristics of a material directly from the 3D model and transformed PMI data according to an example embodiment.

FIG. 3 is a screen shot of a view 300 provided by an inspection plan generator used to create a task list 310 for inspection of characteristics of a material 315 directly into the 3D model and transformed PMI data. A section of the view 300 includes header details 320, such as a material identified as "JKN_LEGO_30" for a Lego® brick. The brick is simply used a familiar example. Many other products and materials with different characteristics may be used.

A selection of model views is provided in view 300 as indicated in a list 325. A bottom view 2 icon 330 has been selected, resulting in a bottom view 2 of the part being displayed at 335 with two characteristics indicated in text form with suitable dimensional identifiers pointing to a portion of the part associated with the dimensions. Note that several other views are available for selection including icons for a top view 1 at 340, section view 1 at 341, top view 1 capture at 342, released capture at 343, all annotations capture at 344, section view 1 capture at 345, and bottom view capture at 346. Each icon includes a miniature preview of the view the icons represent in one embodiment.

An inspection plan portion 350 of the view 300 shows a selected line item 355 with a description of "dimensional inspection", which is shown as selected, and results in two items being shown in an inspection plan: characteristics view 360 of the bottom view 2. Each item shows a target dimension or characteristic corresponding to the dimensions illustrated in the view 335, along with lower 362 and upper 364 dimensions, and units 366. Thus, each of the dimensions from the PMI data have been converted or transformed into items in an inspection plan. As seen in the all annotation captures 344, many other characteristics may be included in the plan and would show up under the characteristics view 360 if icon 344 were selected. Thus, the PMI data has been linked directly to the inspection characteristic of the inspection plan.

Figure 4:
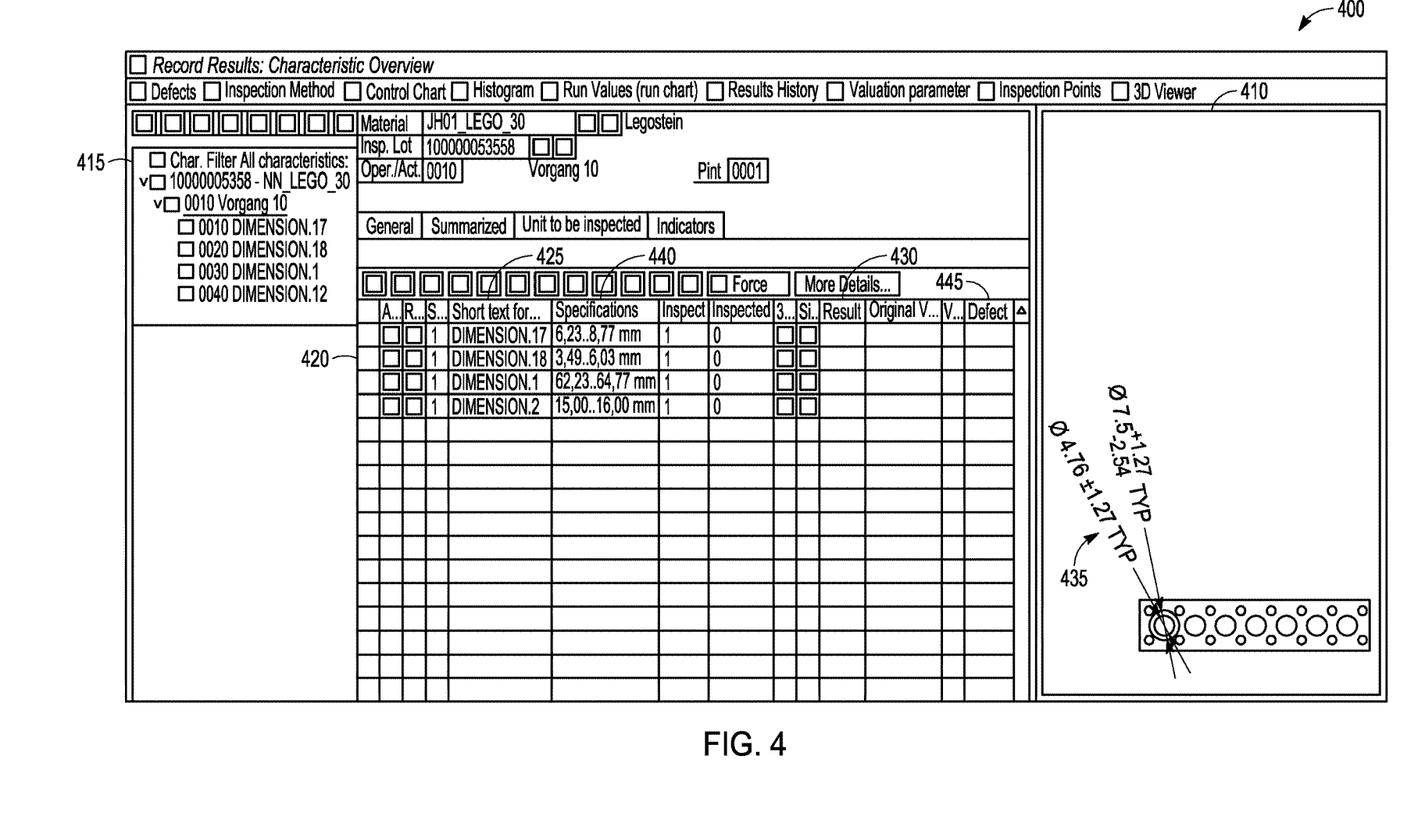
FIG. 4 is a screen shot of a record results view according to an example embodiment.

Once the PMI data is linked to the inspection characteristics the inspection plan can be created and may be used in results recording within the entire inspection process as illustrated in FIG. 4 which shows a screen shot of a record results view 400. Since now the inspection plan is connected to the 3D model, inspection order processing can also be visually supported as well during results recording. The record results view 400 also includes a view of the part at 410, a selection section 415 containing a folder like view of the part including multiple dimensions, and a list of the characteristics to be inspected. Various characteristics, in this case, dimensions, are show in an inspection list at 420. Dimension 17 at 425 is shown as selected. A result column 430 is provided for an inspector to enter the results of measurements. The view 410 of the part may provide text attributes as indicated at 435 to visually identify the measurement of the part to be taken, corresponding to the selected dimension indicated at 425. A specifications column 440 may show the range of measurements that are within tolerance, and a defect column 445 may be provided to flag results that are outside of tolerance.

Figure 5:
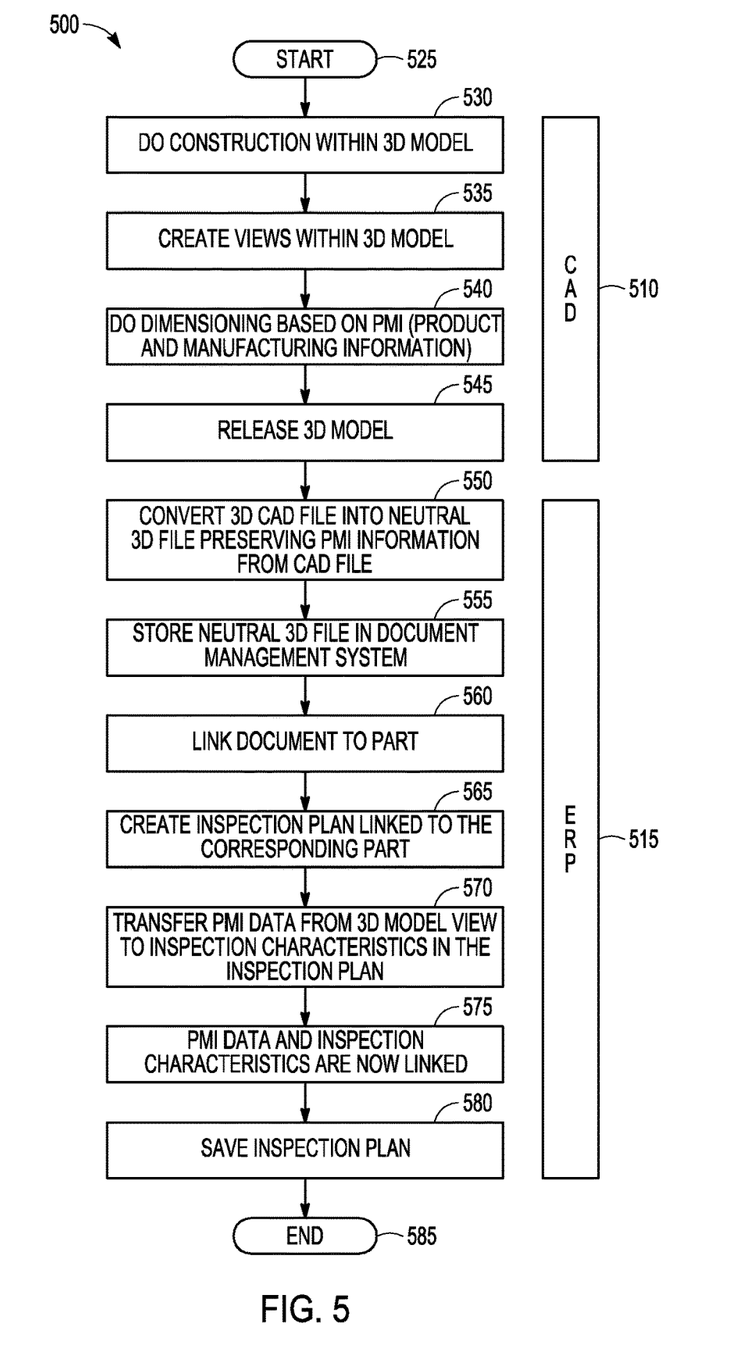
FIG. 5 is a flowchart illustrating a method of creating an inspection plan according to an example embodiment.

FIG. 5 is a flowchart illustrating a detailed method 500 of creating an inspection plan according to an example embodiment. The flowchart includes indications of whether operations of the method are performed by CAD system hardware executing CAD software at 510, or by the integrated ERP system hardware executing application software at 515. Method 500 starts at 525, beginning with construction of the part within the 3D model. Views may be created within the 3D model at 530. Dimensioning of the part based on PMI data may be performed at 540, and the model may be released at 545. Note that the design and release may be performed by the CAD system via interaction with a user. The CAD system creates and stores the data corresponding to the 3D model responsive to the user interaction.

Once released, the 3D model in the form of a 3D CAD file is received by the ERP system 515 at 550 and converted into a neutral 3D file, which is a lightweight file that is viewable without use of the CAD system. In one embodiment, the SAP Visual Enterprise Generator may be used to translate the CAD model into the neutral 3D file. Method 200 may perform such conversion in some embodiments. In one embodiment, the neutral 3D file does not contain any CAD specific information. The so-called features, which describe in detail, how the product has been designed are removed. The resulting geometry has been tessellated, i.e. the geometry is no longer exact. The conversion results in a neutral 3D file that is difficult to reverse engineer. Further, the file size is only a fraction of the original CAD model. Such a neutral 3D file can then be used for collaboration purposes. Usually, there are free viewers available for such neutral 3D files.

At 555, the neutral 3D file is stored in a document management system accessible by the ERP system 515. The document is linked to the part at 560. In one embodiment, a link is a database entry, which refers to the PMI objects which are linked by object ID. For example, given a database entry for the document DOC123 and a database entry for the Part M456. The database entry for the link L123456 has attributes DOC123 and M456.

At 565, the inspection plan is created by listing one or more inspection characteristics, and then linked to the corresponding part. The inspection plan link and the neutral 3D file link may be used to transfer PMI data at 570 from the 3D model view to inspection characteristics with a nominal or target value and lower and upper values in the inspection plan. The PMI data and inspection characteristics are now linked as indicated at 575. The inspection plan is then saved at 580 and the method ends at 585 and the inspection plan may be used during the performance of inspections.

Figure 6:
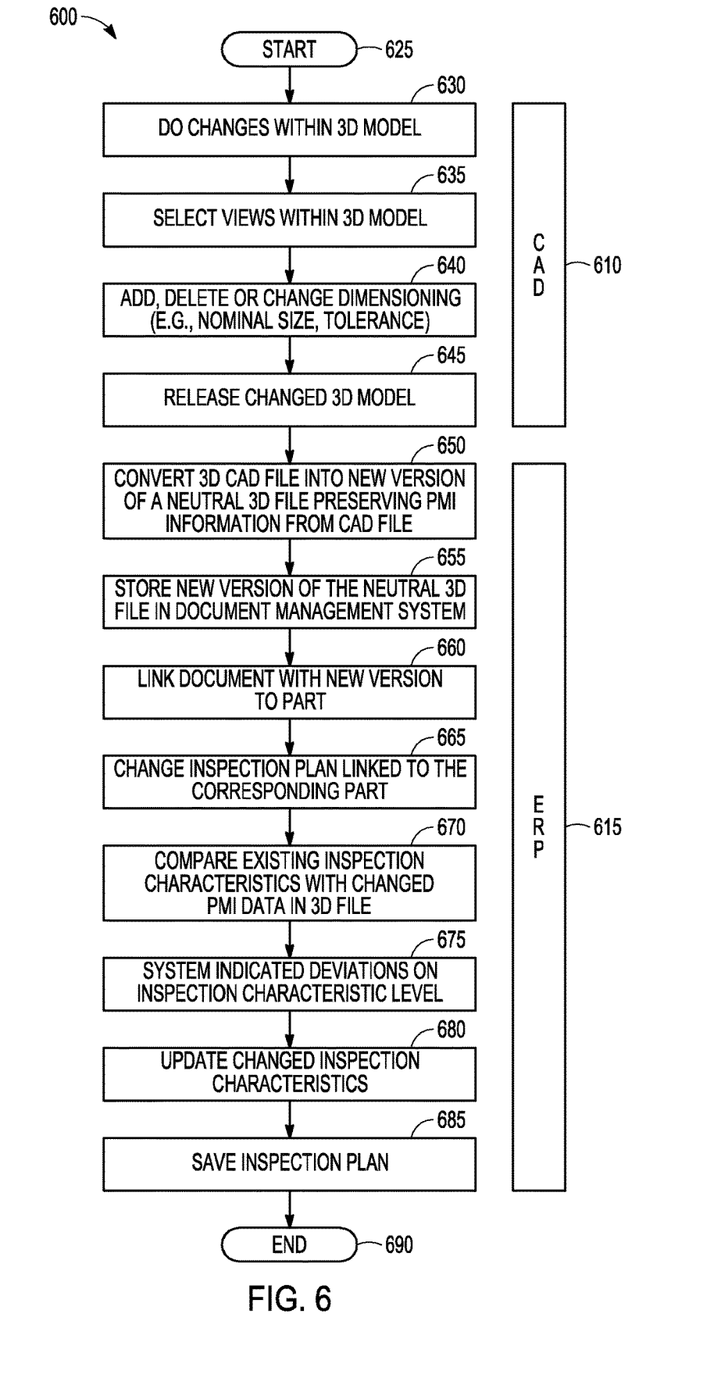
FIG. 6 is flowchart illustrating operations performed in a method of changing the inspection plan according to an example embodiment.

FIG. 6 is a flowchart illustrating operations performed in a method 600 of changing the inspection plan. Method 600 is shown with indications of whether operations of the method are performed by CAD system hardware executing CAD software at 610, or by the integrated ERP system hardware executing application software at 615. Method 600 starts at 625 beginning changes being made within the 3D model at 630. Views may be selected in the 3D model at 635 and dimensioning, such as nominal sizes and tolerances may be added, deleted or changed at 640. The changed 3D model may be released at 645. At 650, the ERP system 615 may be used to convert the 3D CAD file into a new version of a neutral 3D file preserving the PMI information from the CAD file.

At 655, the new version of the neutral 3D file may be stored in the document management system, and that document is linked with the new version to the part at 660. At 670, the existing inspection characteristics are compared with changed PMI data in the 3D file. The ERP system indicates deviations on an inspection characteristic level at 675. In one embodiment, an inspection plan is a multilevel structure having a plan level, operations level, and inspection characteristics level. The inspection characteristic is on the lowest level of the inspection plan structure. An update of the changed inspection characteristics is performed at 680 and the inspection plan is saved at 685. The method 600 ends at 890, and the revised inspection plan may be used to perform inspections.

Figure 7:
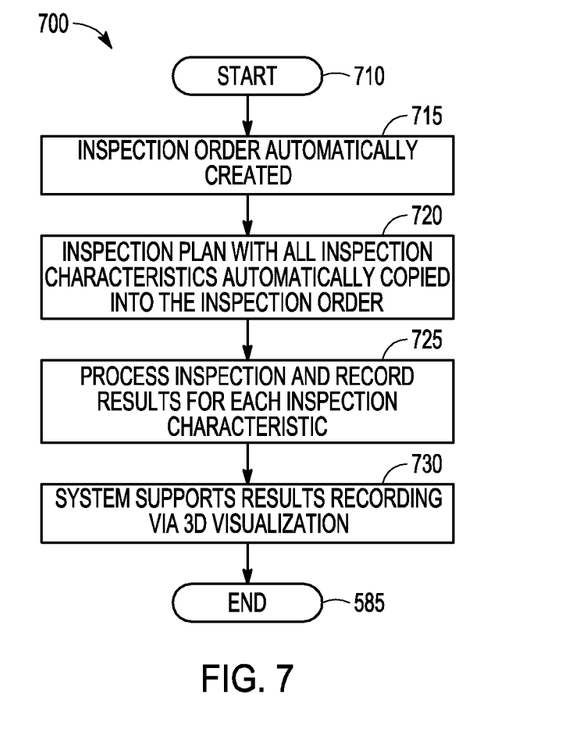
FIG. 7 is a flowchart illustrating operations performed in a method of using an enterprise resource planning (ERP) system to aid in performing the inspection plan according to an example embodiment.

FIG. 7 is a flowchart illustrating operations performed in a method 700 of using the ERP system to aid in performing the inspection plan. Method 700 starts at 710, and an inspection order is automatically created at 715. At 720, an inspection plan with all inspection characteristics is automatically copied into the inspection order. The inspection is processed and results are recorded at 725 for each inspection characteristic. Processing the inspection may involve manual measurements by a person or automated measurements via imaging and image analysis or laser based measurements in further embodiments. At 730, the ERP system inspection application may support results recorded via 3D visualization, such as shown in 3D views of icons in FIG. 3, where a three dimensional image of the part may be displayed with attributed text corresponding to dimensions being measured as also shown in FIG. 4. Method 700 ends at 735.

Figure 8:
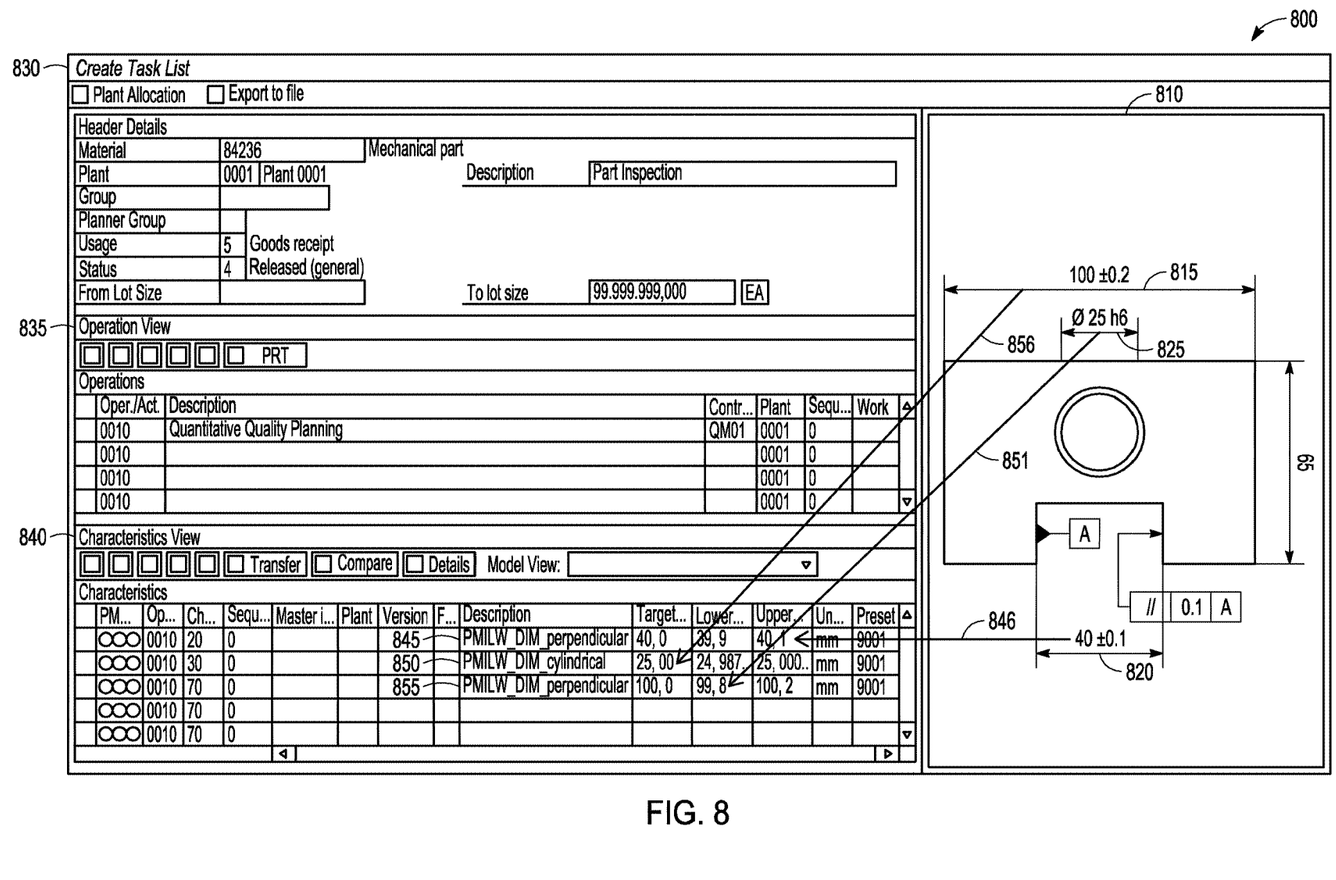
FIG. 8 is a screen shot of a view provided by an inspection plan generator to generate inspection characteristic tasks according to an example embodiment.

FIG. 8 is a screen shot of a view 800 provided by an inspection plan generator which may be included in the ERP system. A graphical view of a material, such as the product 100 is shown at 810 and includes multiple instances of PMI data as indicated at 815, 820, and 825 which are dimensions and tolerances of various features of the material shown at 810. View 800 is similar to view 300, and also includes a create task list section 830 which contains fields to identify the material as a specific mechanical part, a plant number and description of the task as a part inspection. Information regarding groups, planner groups, usage, status, and lot sizes may also be included.

An operation view is provided at 835 to provide fields identifying operations. One operation is shown: "Quantitative Quality Planning". A characteristics view 840 is also provided and includes specific tasks, referred to as inspection characteristics, to be performed during an inspection which are automatically derived from and filled in based on the PMI data from the view 810 of the material. For instance, three entries, 845, 850, and 855 are shown in view 840 with corresponding lines 846, 851, and 856 showing where the data for the entries was obtained from the PMI data indicated at 820, 825, and 815 respectively. Target values, lower values, and upper values are also included in fields in the view 840.

Figure 9:
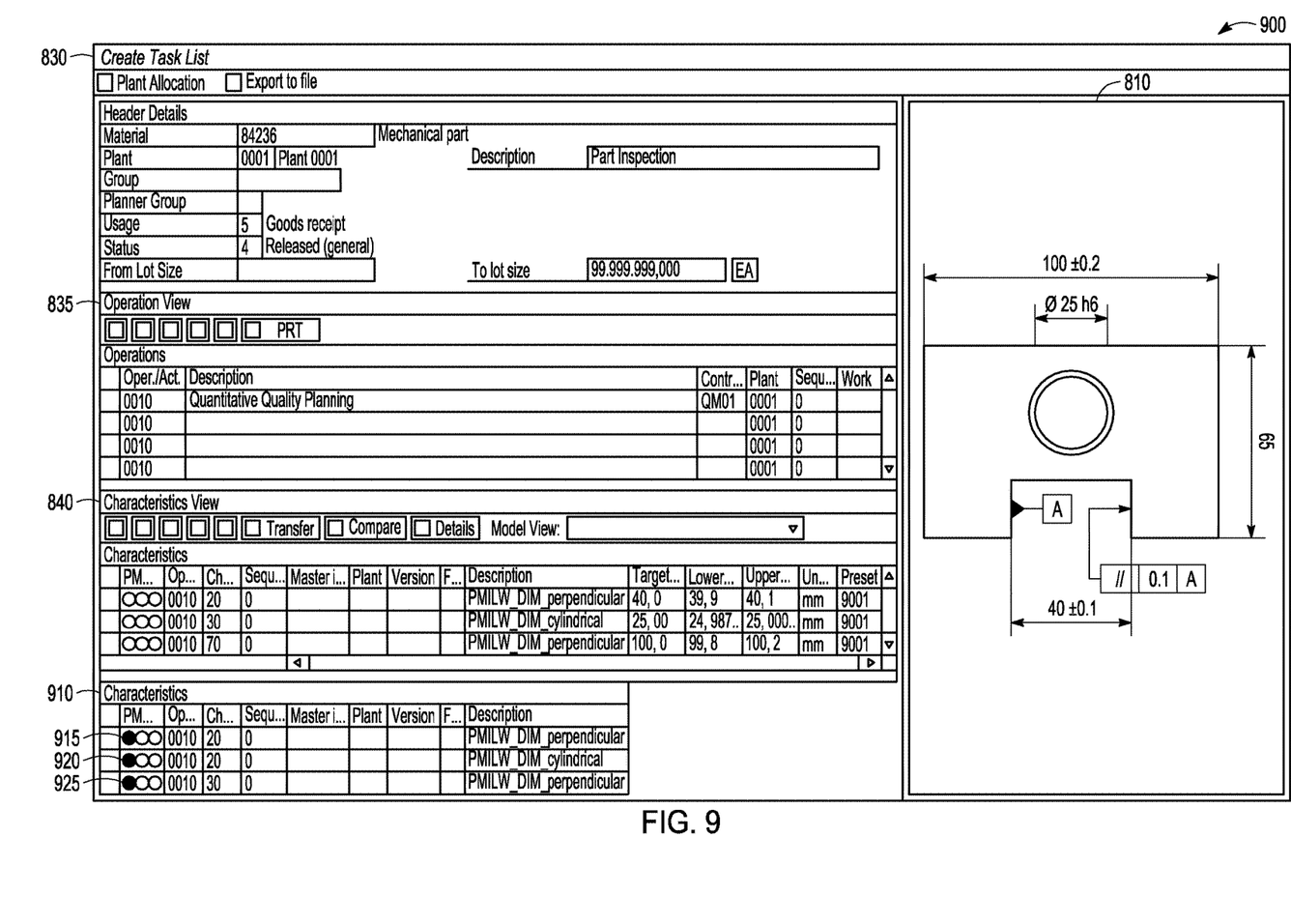
FIG. 9 is a screen shot of a view provided by the inspection plan generator to compare PMI data of different design versions of a material according to an example embodiment.

FIG. 9 is a screen shot of a view 900 provided by the inspection plan generator to compare PMI data between two design versions of a material. View 900 provides the same views as FIG. 8 which are identified by the same reference numbers as in FIG. 8. In addition, a further characteristics view 910 is provided that is similar to the characteristics view 840, but shows the inspection characteristics of a new version of the material. View 910 includes one or more PMI check boxes or circles in this case for each inspection characteristic as indicated at 915, 920, and 925. The circles are used by the inspection plan generator to indicate whether or not one or more parameters or values associated with the inspection characteristic has changed between the versions. If changed, the inspection plan may be updated to reflect the change. If not changed, the inspection plan need not be changed.

Figure 10:
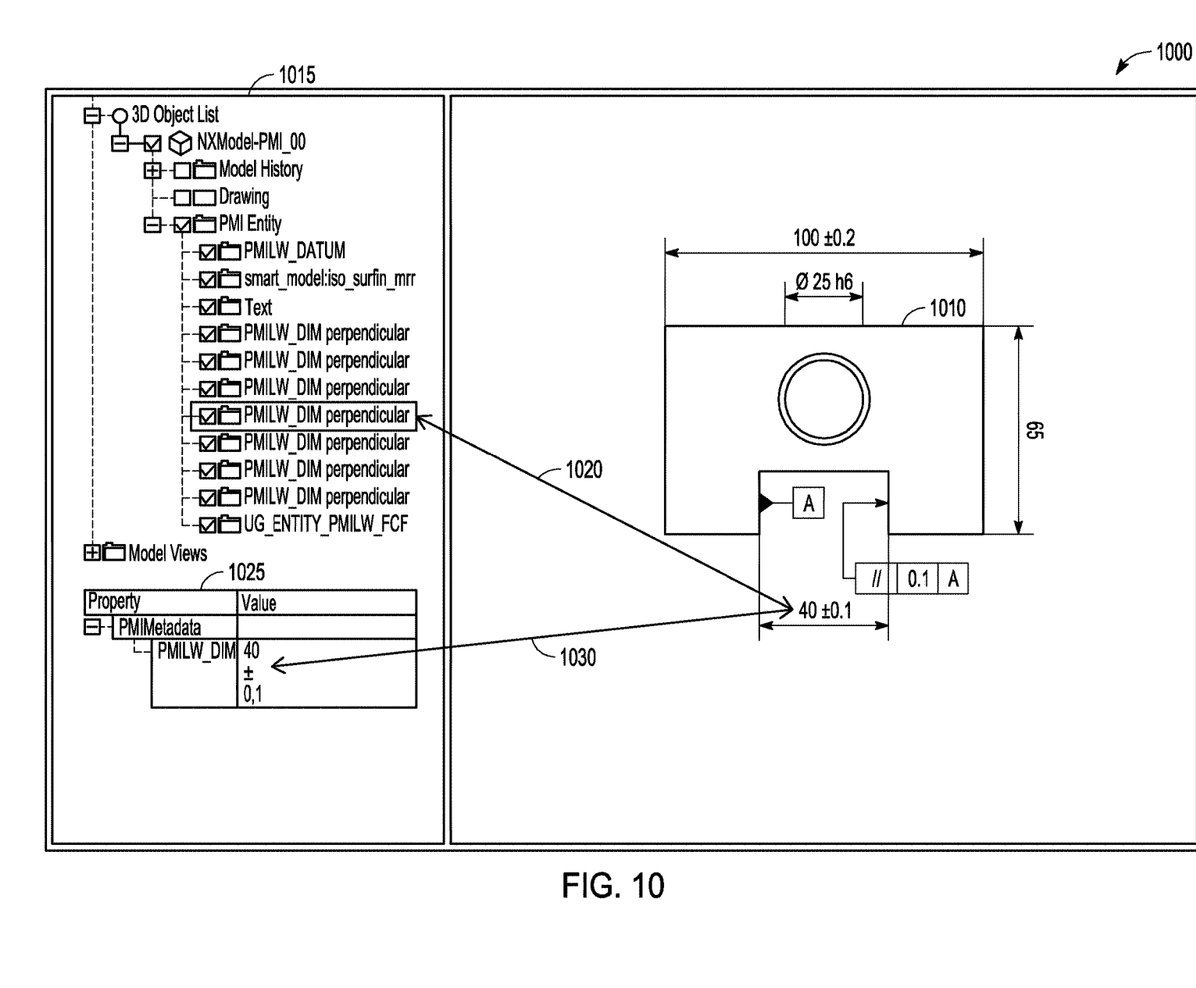
FIG. 10 is a screen shot of a view showing a relationship between a material and PMI of a CAD 3D model as a tree structure according to an example embodiment.

FIG. 10 is a screen shot of a view which shows a relationship between a material or part in a viewport and PMI in the 3D file as a tree structure at 1000. The tree structure may be referred to as a scene tree in one embodiment since the visual display in the viewport may be referred to as a scenery. The material is shown in a view 1010. A 3D object list 1015 is shown as a directory structure with a PMILW_DIM_perpendicular folder selected corresponding to a particular characteristic indicated by a double arrow 1020, resulting in PMI Metadata being shown at 1025 for a particular inspection characteristic indicated by double sided arrow 1030.

Figure 11:
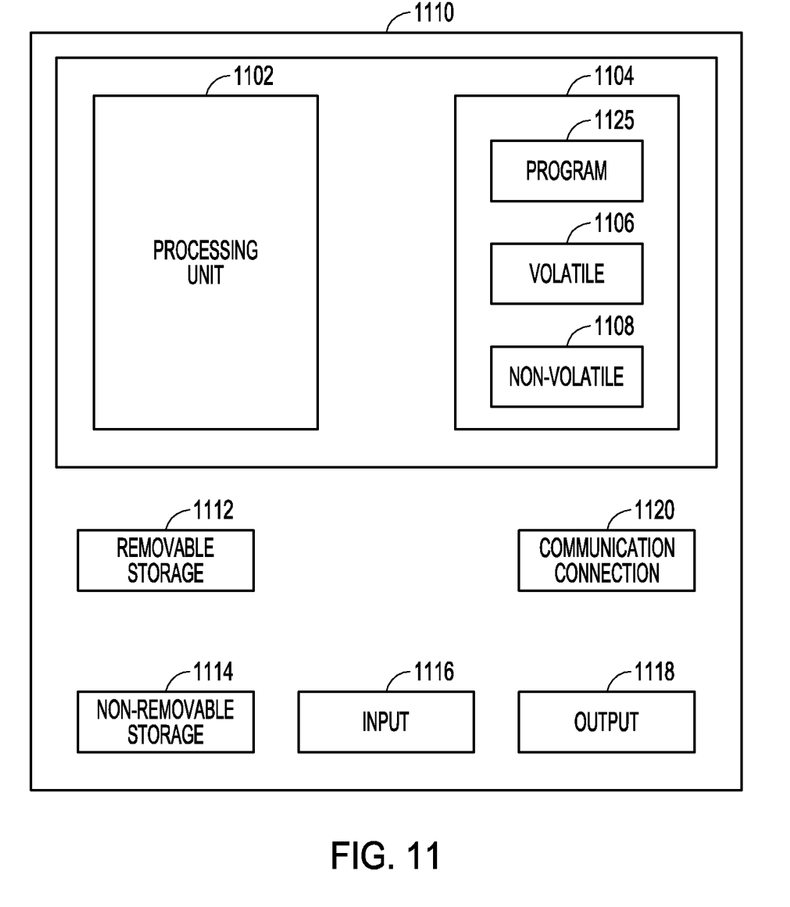
FIG. 11 is a block schematic diagram of a system for automatically transforming PMI data from a 3D computer aided design (CAD) file and generating inspection plans according to an example embodiment.

FIG. 11 is a block schematic diagram of a system for automatically transforming PMI data from a 3D computer aided design (CAD) file and generating inspection plans according to an example embodiment. All components need not be used in various embodiments. One example computing device in the form of a computer 1100, may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices such as smartphones, tablets, and smartwatches are generally collectively referred to as mobile devices. Further, although the various data storage elements are illustrated as part of the computer 1100 where one or more programs of an ERP system and data such as CAD files and PMI data may be stored, the storage may also or alternatively include cloud-based storage accessible via a network, such as the Internet.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 1102 of the computer 1100 to implement one or more of the methods described and illustrated in the flowcharts. A hard drive, CD-ROM, and RAM are some examples of articles including a non-transitory computer-readable medium such as a storage device. The terms computer-readable medium and storage device do not include carrier waves. For example, a computer program 1118 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1100 to provide generic access controls in a COM based computer network system having multiple users and servers.

EXAMPLES

1. A computer implemented method having operations comprising:
    receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic;
    converting the 3D CAD file into a neutral 3D file preserving the PMI data;
    parsing the PMI data via the executing integrated inspection application to obtain lower and upper values of the characteristic of the product as a function of the tolerance value;
    storing the neutral 3D file;
    linking the neutral 3D file to the part in the ERP system;
    creating an inspection plan including an inspection characteristic linked to the part;
    transferring the PMI data to the inspection characteristic; and
    providing a view of the inspection characteristic showing the lower and upper values.

2. The method of example 1 wherein the characteristic includes multiple characteristics of the part, each characteristic having a tolerance value from which lower and upper values are obtained via the parsing operation.

3. The method of any of examples 1-2 wherein the characteristic comprises a nominal length of a portion of the part and wherein the lower and upper values are based on deviations from the nominal length as defined by the tolerance value.

4. The method of any of examples 1-3 wherein parsing the PMI data includes recognizing a convention in which the PMI data is expressed.

5. The method of any of examples 1-4 and further comprising:
    comparing an existing inspection plan to PMI data in an updated 3D file corresponding to changes made to the 3D model; and
    updating the inspection plan with characteristics that changed.

6. The method of any of examples 1-5 wherein the operation of providing a view of the inspection characteristic showing the lower and upper values comprises providing a column for recording results of inspection of multiple characteristics of the product.

7. The method of any of examples 1-6 wherein the operation of providing a view of the inspection characteristic comprises showing a view of the product.

8 The method of example 7 wherein the view of the product includes text associated with the characteristic to be inspected and providing nominal, lower, and upper values for the characteristic.

9. The method of any of examples 7-8 and further comprising providing multiple icons of different views of the product such that selection of the icon results in a corresponding view of the product being provided that includes text associated with characteristics to be inspected that are visible in the provided view.

10. The method of any of examples 1-9 wherein the operation of providing a view of the inspection characteristic comprises providing a column to flag results that are outside of tolerance.

11. A machine readable storage device having instructions for execution by a processor of the machine such that when executed, cause the machine to perform operations comprising:
    receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic;
    converting the 3D CAD file into a neutral 3D file preserving the PMI data;
    parsing the PMI data via the executing integrated inspection application to obtain lower and upper values of the characteristic of the product as a function of the tolerance value;
    storing the neutral 3D file;
    linking the neutral 3D file to the part in the ERP system;
    creating an inspection plan including an inspection characteristic linked to the part;
    transferring the PMI data to the inspection characteristic; and
    providing a view of the inspection characteristic showing the lower and upper values.

12. The machine readable storage device of example 11 wherein the characteristic includes multiple characteristics of the part, each characteristic having a tolerance value from which lower and upper values are obtained via the parsing operation.

13. The machine readable storage device of any of examples 11-12 wherein the characteristic comprises a nominal length of a portion of the part and wherein the lower and upper values are based on deviations from the nominal length as defined by the tolerance value.

14. The machine readable storage device of any of examples 11-13 wherein parsing the PMI data includes recognizing a convention in which the PMI data is expressed.

15. The machine readable storage device of any of examples 11-14 wherein the operations further comprise:
comparing an existing inspection plan to PMI data in an updated 3D file corresponding to changes made to the 3D model; and
updating the inspection plan with characteristics that changed.

16. The machine readable storage device of any of examples 11-15 wherein the operation of providing a view of the inspection characteristic showing the lower and upper values comprises providing a column for recording results of inspection of multiple characteristics of the product, wherein the operation of providing a view of the inspection characteristic comprises showing a view of the product, and wherein the view of the product includes text associated with the characteristic to be inspected and providing nominal, lower, and upper values for the characteristic.

17. A device comprising:
a processor; and
a memory device coupled to the processor and having a program stored thereon for execution by the processor, that when executed, cause the processor to perform operations comprising:
receiving a 3D computer aided design (CAD) file that contains a 3D model of a product and product management information (PMI) data, at an enterprise resource planning (ERP) hardware system having an executing integrated inspection application, the PMI data including data describing a characteristic of the product and a tolerance value for the characteristic;
converting the 3D CAD file into a neutral 3D file preserving the PMI data;
parsing the PMI data via the executing integrated inspection application to obtain lower and upper values of the characteristic of the product as a function of the tolerance value;
storing the neutral 3D file;
linking the neutral 3D file to the part in the ERP system;
creating an inspection plan including an inspection characteristic linked to the part;
transferring the PMI data to the inspection characteristic; and
providing a view of the inspection characteristic showing the lower and upper values.

18. The device of example 17 wherein the characteristic includes multiple characteristics of the part, each characteristic having a tolerance value from which lower and upper values are obtained via the parsing operation, and wherein parsing the PMI data includes recognizing a convention in which the PMI data is expressed.

19. The device of any of examples 17-18 wherein the operations further comprise:
comparing an existing inspection plan to PMI data in an updated 3D file corresponding to changes made to the 3D model;
updating the inspection plan with characteristics that changed; and
wherein the operation of providing a view of the inspection characteristic showing the lower and upper values comprises providing a column for recording results of inspection of multiple characteristics of the product.

20. The device of any of examples 17-19 wherein the operation of providing a view of the inspection characteristic comprises showing a view of the product, wherein the view of the product includes text associated with the characteristic to be inspected and providing nominal, lower, and upper values for the characteristic, and wherein the operations further comprise providing multiple icons of different views of the product such that selection of the icon results in a corresponding view of the product being provided that includes text associated with characteristics to be inspected that are visible in the provided view.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method having operations comprising:
receiving, at one or more processors of an enterprise resource planning (ERP) system having an executing integrated inspection application, a 3D computer aided design (CAD) file that contains a 3D model of a product and product management information (PMI) data, the PMI data including data describing a characteristic of the product and a tolerance value for the characteristic of the product;
converting, by the one or more processors of the ERP system, the 3D CAD file into a neutral 3D file preserving the PMI data;
parsing, by the one or more processors of the ERP system, the PMI data via the executing integrated inspection application to determine the tolerance value comprising structured text for the characteristic of the product;
converting, by the one or more processors of the ERP system, the tolerance value comprising structured text of the PMI data into numerical values for a target value, a lower value, and an upper value of the characteristic of the product, according to a convention for the 3D model associated with the PMI data;
storing, by the one or more processors of the ERP system, the neutral 3D file;
linking, by the one or more processors of the ERP system, the neutral 3D file to the product in the ERP system;
creating, by the one or more processors of the ERP system, an inspection plan including an inspection characteristic linked to the product;
transferring, by the one or more processors of the ERP system, the PMI data to the inspection characteristic of the inspection plan with the target value, lower value, and upper value;
providing, by the one or more processors of the ERP system, a view of the inspection plan comprising the inspection characteristic showing the target value, lower value, and upper value;
determining, by the one or more processors of the ERP system, that a second neutral 3D file comprises changed PMI data corresponding to an updated 3D model for the product;
comparing, by the one or more processors of the ERP system, the inspection characteristic with the target value, lower value, and upper value, to the changed PMI data;

updating, by the one or more processors of the ERP system, the inspection characteristic to include the changed PMI data and generate a revised inspection plan; and providing, by the one or more processors of the ERP system, a view of the revised inspection plan including the updated inspection characteristic.

2. The method of claim 1 wherein the characteristic of the product includes multiple characteristics of the product, each of the multiple characteristics having a tolerance value from which lower and upper values are obtained via the parsing operation.

3. The method of claim 1 wherein the characteristic of the product comprises a nominal length of a portion of the product and wherein the lower and upper values are based on deviations from the nominal length as defined by the tolerance value.

4. The method of claim 1 wherein parsing the PMI data includes recognizing a convention in which the PMI data is expressed.

5. The method of claim 1 wherein the operation of providing a view of the inspection plan comprising the inspection characteristic further comprises showing a view of the product.

6. The method of claim 5 wherein the view of the product includes text associated with the characteristic of the product to be inspected and providing nominal, lower, and upper values for the characteristic of the product.

7. The method of claim 5 and further comprising providing multiple icons of different views of the product such that selection of an icon results in a corresponding view of the product being provided that includes text associated with characteristics of the product to be inspected that are visible in the provided view.

8. The method of claim 1 wherein the operation of providing a view of the inspection plan comprising the inspection characteristic further comprises providing a column to flag results that are outside of tolerance.

9. The method of claim 1, wherein converting the 3D CAD file into a neutral 3D file comprises removing CAD specific information about product design.

10. The method of claim 1, wherein linking the neutral 3D file to the product in the ERP system comprises creating a database entry for a link with attributes of a product identifier for the product and a PMI object identifier for the PMI data.

11. The method of claim 1, wherein providing the view of the inspection plan comprising the inspection characteristic further comprises providing a column for recording results of inspection of multiple characteristics of the product.

12. The method of claim 1, wherein the inspection plan is a multilevel structure having a plan level, operations level, and inspection characteristics level.

13. A machine readable storage device having instructions for execution by a processor of the machine such that when executed, cause the machine to perform operations comprising:

receiving, at an enterprise resource planning (ERP) hardware system having an executing integrated inspection application, a 3D computer aided design (CAD) file that contains a 3D model of a product and product management information (PMI) data, the PMI data including data describing a characteristic of the product and a tolerance value for the characteristic of the product;

converting the 3D CAD file into a neutral 3D file preserving the PMI data;

parsing the PMI data via the executing integrated inspection application to determine the tolerance value comprising structured text for the characteristic of the product;

converting the tolerance value comprising structured text of the PMI data into numerical values for a target value, a lower value, and an upper value of the characteristic of the product, according to a convention for the 3D model associated with the PMI data;

storing the neutral 3D file;

linking the neutral 3D file to the product in the ERP system;

creating an inspection plan including an inspection characteristic linked to the product;

transferring the PMI data to the inspection characteristic of the inspection plan with the target value, lower value, and upper value;

providing a view of the inspection plan comprising the inspection characteristic showing the target value, lower value, and upper value;

determining that a second neutral 3D file comprises changed PMI data corresponding to an updated 3D model for the product;

comparing the inspection characteristic with the target value, lower value, and upper value, to the changed PMI data;

updating the inspection characteristic to include the changed PMI data and generate a revised inspection plan; and providing a view of the revised inspection plan including updated inspection characteristic.

14. The machine readable storage device of claim 13 wherein the characteristic of the product includes multiple characteristics of the product, each characteristic of the product having a tolerance value from which lower and upper values are obtained via the parsing operation.

15. The machine readable storage device of claim 13 wherein the characteristic of the product comprises a nominal length of a portion of the product and wherein the lower and upper values are based on deviations from the nominal length as defined by the tolerance value.

16. The machine readable storage device of claim 13 wherein parsing the PMI data includes recognizing a convention in which the PMI data is expressed.

17. A device comprising:

a processor; and a memory device coupled to the processor and having a program stored thereon for execution by the processor, that when executed, cause the processor to perform operations comprising:

receiving, at an enterprise resource planning (ERP) hardware system having an executing integrated inspection application, a 3D computer aided design (CAD) file that contains a 3D model of a product and product management information (PMI) data, the PMI data including data describing a characteristic of the product and a tolerance value for the characteristic of the product;

converting the 3D CAD file into a neutral 3D file preserving the PMI data;

parsing the PMI data via the executing integrated inspection application to determine the tolerance value comprising structured text for the characteristic of the product;

converting the tolerance value comprising structured text of the PMI data into numerical values for a target value, a lower value, and an upper value of the characteristic of the product, according to a convention for the 3D model associated with the PMI data;

storing the neutral 3D file;

linking the neutral 3D file to the product in the ERP system;

creating an inspection plan including an inspection characteristic linked to the product;

transferring the PMI data to the inspection characteristic of the inspection plan with the target value, lower value, and upper value;

providing a view of the inspection plan comprising the inspection characteristic showing the target value, lower value, and upper value;

determining that a second neutral 3D file comprises changed PMI data corresponding to an updated 3D model for the product;

comparing the inspection characteristic with the target value, lower value, and upper value, to the changed PMI data;

updating the inspection characteristic to include the changed PMI data and generate a revised inspection plan; and providing a view of the revised inspection plan including the updated inspection characteristic.

18. The device of claim 17 wherein the characteristic of the product includes multiple characteristics of the product, each characteristic of the product having a tolerance value from which lower and upper values are obtained via the parsing operation, and wherein parsing the PMI data includes recognizing a convention in which the PMI data is expressed.

19. The device of claim 17 wherein the operation of providing a view of the inspection plan comprising the inspection characteristic showing the lower and upper values further comprises providing a column for recording results of inspection of multiple characteristics of the product.

20. The device of claim 17 wherein the operation of providing a view of the inspection plan comprising the inspection characteristic comprises showing a view of the product, wherein the view of the product includes text associated with the characteristic of the product to be inspected and providing nominal, lower, and upper values for the characteristic of the product, and wherein the operations further comprise providing multiple icons of different views of the product such that selection of an icon results in a corresponding view of the product being provided that includes text associated with characteristics of the product to be inspected that are visible in the corresponding view.

* * * * *